(12) United States Patent
Ormson et al.

(10) Patent No.: US 7,146,182 B2
(45) Date of Patent: Dec. 5, 2006

(54) UMTS-GSM DUAL MODE TIMING DEVICE

(75) Inventors: Richard Ormson, Wokingham (GB); Nik Bowdler, Guildford (GB); Tony Banks, Reading (GB); Martin Hennelly, Pirbright (GB)

(73) Assignee: NEC Corporation, Tokyo (JP)

( * ) Notice: Subject to any disclaimer, the term of this patent is extended or adjusted under 35 U.S.C. 154(b) by 473 days.

(21) Appl. No.: 10/410,683

(22) Filed: Apr. 10, 2003

(65) Prior Publication Data

US 2004/0110479 A1 Jun. 10, 2004

(30) Foreign Application Priority Data

Apr. 12, 2002 (GB) ................. 0208484.6

(51) Int. Cl.
*H04B 7/01* (2006.01)

(52) U.S. Cl. ...................... 455/502; 370/509

(58) Field of Classification Search ................ 455/436, 455/343, 450, 208, 438, 502, 442, 422.1, 455/432.1, 435.2, 437, 443, 507, 444; 375/354, 375/347; 370/503, 506, 507, 304, 342, 350, 370/509–510
See application file for complete search history.

(56) References Cited

U.S. PATENT DOCUMENTS 6,785,352 B1 * 8/2004 Ranta .................... 375/354

\* cited by examiner

*Primary Examiner*—Edward F. Urban
*Assistant Examiner*—Tu X. Nguyen
(74) *Attorney, Agent, or Firm*—Scully, Scott, Murphy & Presser, P.C.

(57) ABSTRACT

The present invention provides for a cellular radio communications device arranged for use with first and second communication systems having different timebases, and including means for determining the offset between the timebase at a serving cell of the first system and the timebase of a neighboring cell of the second system, the said means for determining including timing means being arranged to be controlled by frame-boundary signals of the first and second communication systems.

8 Claims, 1 Drawing Sheet

UMTS-GSM DUAL MODE TIMING DEVICE

BACKGROUND OF THE INVENTION

1. Technical Field

The present invention relates to a cellular radio communications device, and related method of operation aid, in particular, to a mobile phone and related method of operation.

2. Prior Art

Mobile phone comprises a master clock circuit for generating a relatively high frequency clock signal which forms part of the timebase circuitry within the mobile phone. The timebase generated within the mobile phone is intended to be synchronized with a timebase of a base station with which the mobile phone communicates in accordance with a particular communication system such as, for example, the Global System for Mobile Communication (GSM).

A plurality of mobile communication systems available have been developed which require different master clocks and timebases for their operation.

A mobile phone offering access to two or more such systems would therefore be advantageous since the same mobile phone handset could then be used with a selected one of the different communication systems supported. This choice of system for the same mobile phone would therefore lead to a greater geographical coverage for one and the same mobile phone since different communication systems commonly exhibit different geographical boundaries. This geographical limit commonly occurs at international boundaries and also occurs as a consequence of the time taken to achieve full coverage of a network technology. Such a dual mode mobile phone would therefore be particularly attractive to users who travel overseas and also to the early users of new technology communications systems.

For such dual mode mobile phones and, for example, for those employing the Universal Mobile Telecommunications System (UMTS) and GSM, it has been identified that there is a requirement to measure the time period between defined points in the timebase of, for example, a UMTS serving cell and each GSM neighbouring cell.

While this application is primarily aimed at dual mode UMTS GSM usage, the principles described can be used on any systems using a well defined timebase. The principles can also be used without significant modification in cellular equipment operating on more than two systems.

It has been identified that such a timing offset is required in order to allow for full interoperability between the different communication systems and thus allow for the execution of full dual-mode operations within the mobile phone handset.

The offset needs to be known to allow specified times on one system and to be translated into the timebase of the other system (and vice versa). Without knowledge of the offset such translation is not possible and coordination of operation of the two systems would bot prove possible.

SUMMARY OF THE INVENTION

The present invention therefore seeks to provide for a cellular radio communication device, and related method of operating which allows for the accurate determination of a timing offset value and which limits the impact on UMTS and GSM hardware arrangements and protocol stacks as currently available.

According to one aspect of the present invention, there is provided a cellular radio communications device arranged for use with first and second communication systems having different timebases, and including means for determining the offset between the timebase at a serving cell of the first system and the timebase of a neighbouring cell of the second system, the said means for determining including timing means being arranged to be controlled by frame-boundary signals of the first and second communication systems.

The present invention is particularly advantageous in providing for the aforementioned determination of the timing offset in a manner that allows for ready incorporation into current mobile phone circuit architecture.

Preferably, the said means for determining is arranged to employ a UMTS protocol stack having its timebase synchronized to the serving cell and wherein the GSM timebase comprises a free-running timebase when UMTS is the serving system. Similarly, when GSM is the serving system the GSM timebase is locked to the serving cell and the UMTS timebase is free running.

Advantageously, the said means for determining is arranged to determine the timing offset on the basis of the offset between the GSM free-running timebase and the timebase of a plurality of neighbouring cells in the GSM system.

The device can therefore be arranged such that a frame-zero signal from UMTS circuitry services to initiate the timing means and a frame-zero from GSM circuitry is arranged to stop the timing means.

In a particular embodiment of the present invention the said timing means is arranged to be controlled by frame interrupt signals.

Advantageously, the invention makes use of protocol stack knowledge of current frame numbers to reduce the measurement time and counter size required. The invention is arranged such that a frame interrupt signal from the UMTS circuitry serves to initiate the timing means and the first subsequent GSM frame interrupt signals serve to stop the timing means. Preferably, a 15.36 MHz clock is arranged for controlling a counter of the said timing means. The counter means is arranged to count up to a maximum of one GSM frame, as this is the maximum time that need to be measured.

Preferably, the device includes a register for controlling the counting means.

Advantageously, the counter is arranged to be initiated by a UTRA frame interrupt signal generated by the lower layers of the UMTS protocol stack at the start of a subsequent UTRA frame.

The offset time period can then be calculated using knowledge of the two frame numbers and the counter value.

According to another aspect of the present invention, there is provided a method of operating a cellular radio communication device arranged for use with one of a first and second communication system having different timebases, and including the steps of determining the offset between the timebase of a serving cell for the first system and the timebase of a neighbouring cell of the second system, and controlling a timing means for determining the offset by way of frame boundary signals of the first and second communication systems.

BRIEF DESCRIPTION OF THE DRAWINGS

The invention is described further hereinafter, by way of example only, with reference to the accompanying drawings in which.

DESCRIPTION OF THE PREFERRED EMBODIMENTS

As mentioned, there is a requirement to report an observed time difference between a serving UMTS cell and each of the best 6 GSM neighbouring cells. The cellular network can then use this information to schedule compressed mode operations. Compressed mode is required to provide for Receive Signal Strength Indication (RSSI) and Base Station Identity Code (BSIC) perform measurements on the GSM cells when the mobile phone is communicating by way of a UMTS call.

Figure 1:
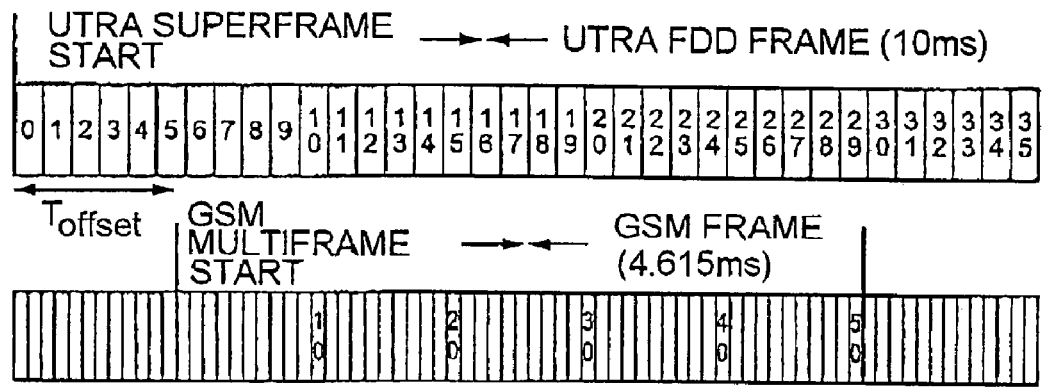
FIG. 1 represents a comparative view between a UTRA frame and GSM frame.

As illustrated in relation to FIG. 1, the observed time difference can be defined as from the start of the UTRA 4096 frame superframe, i.e. SFN=0, to the start of the next GSM 51 multiframe. This is just the value, i.e. $T_{offset}$ in FIG. 1 that needs to be identified and there if no need to measure it directly.

The determination of the time difference between the service cell and neighbouring cell discussed above is defined to a minimum accuracy of +/−20 chip periods. To provide this accuracy, a counter clock of at least 192 KHz is required. However it is noted that a higher degree of accuracy would be advantageous in allowing the logical layer 1 in the protocol stack to employ more efficiently the time available for monitoring. Thus, the measurement and monitoring could be more efficiently performed by the logical layer 1, while in a GSM dedicated mode, during GSM transmission gaps. The UTRA RF circuitry can then be switched on as soon as the GSM RF circuitry is switched off. Such actions could be performed to an accuracy of one quarter of a GSM symbol, i.e. 923 ns. Similarly, when operating in UTRA compressed mode, a transmission gap is allowed over a whole number of UTRA timeslots, to an accuracy of one chip, i.e. 260 ns.

The inaccuracy of the timing information must be allowed for by the Logical layer 1 when activities are to be scheduled. As an example, if a resolution of 5 us is required, then this period must be added to the calculated start time of the transmission gap/idle period noted above, and then substracted from the end time, or length. It should be appreciated that the amount of time available to perform monitoring tasks is reduced by twice the resolution of the measurement.

The invention advantageously allows for the UMTS and GSM protocol stacks to remain very much in their present form. As part of their normal operation, the protocol stacks generate interrupt signals at frame boundaries on their respective communication systems. As an example, the situation wherein the offset measurement is required and UMTS is the master system and GSM is the slave system, the UMTS protocol stack will have its timebase synchronized to the serving cell and the GSM protocol stack will have its timebase free running.

The GSM system will also have details of the offset between the above-mentioned free-running timebase and each of the best six neighbouring cells of the GSM system. The GSM protocol stack advantageously automatically updates these offset values. It follows that a single measurement of the offset between the UMTS timebase and the free-running GSM timebase can be employed in the calculation of offset values for all relevant GSM cells. Only one measurement need therefore be made.

Two possible arrangements for determining the $T_{offset}$ value through hardware measurement are as follows. First it is possible to arrange for a frame-zero signal from the UMTS circuitry to start a timer and for a frame-zero signal from the GSM circuitry to stop the timer. The measurement then made comprises $T_{offset}$.

Secondaly it is possible to arrange for frame interrupt from the UMTS circuitry to start the timer and for the next GSM frame interrupt to stop the timer. $T_{offset}$ can then be calculated from the measured time and knowledge of the particular UMTS and GSM frame numbers when the timer was started and stopped.

The second arrangement is particularly advantageous since it requires a smaller timer and does not require changes to the current protocol stacks. The first arrangement would require a counter capable of counting over 41 seconds since a UMTS multi-frame lasts for 40.96 seconds, and the GSM 51 multi-frame lasts approx. 0.235 seconds. The second arrangement requires counting for 1 GSM 51 multi-frame at most.

Also, there is no requirement for software to poll for completion over a long period. As the interrupts used to control the counter are already inputs to the protocols stacks it can be arranged that polling only occurs at these well defined points in time.

The periods for which the circuitry must remain active can also advantageously be reduced so as to limit power requirements for the device and the sections of circuitry providing interrupts for the device.

Figure 2:
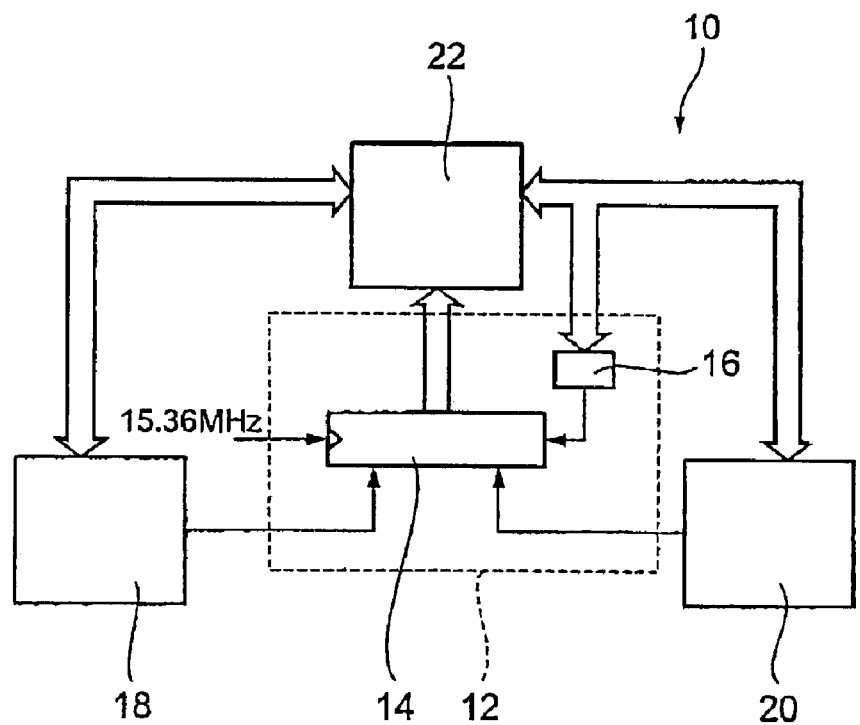
FIG. 2 is a schematic block diagram of part of the architecture of a mobile phone embodying the present invention.

Turning now to FIG. 2, there is illustrated as a schematic block diagram an embodiment of the present invention comprising an architecture 10 for measuring the time period between specified points in the timebase of a UMTS serving cell and a GSM neighbouring cell. There is illustrated a timing device 12 comprising a counter 14 arranged to be controlled by a control register 16. The architecture comprises UMTS architecture including a UMTS protocol stack of which a first layer 18 is illustrated, and GSM architecture including a GSM protocol stack of which a first layer 20 is illustrated. The counter 14 is arranged, under control from the control register 16, to be initiated and interrupted by, for example, frame interrupt signals from the protocol stack layers 18 and 20. The result of the count is output from the counter 14 to high layer 22 of the protocol stack where $T_{offset}$ can be determined.

In operation, the counter 14 is impletmented with a 15.36 MHz clock which can be derived from the UMTS system sample rate. It is a requirement that the counter must be capable of counting up to a maximum of one GSM frame, i.e. 60/13 ms. This can require a 17-bit counter at 15.36 MHz, or indeed a 11 bit counter at 192 KHz. The register 16 services to control the counter 14 and is set to start measurement, and to reset automatically, when measurement is complete.

The GSM protocol stack layer 20 is sent to message requesting that it report the GSM frame number on the next GSM frame interrupt signal. The counter 14 is then enabled and the UMTS protocol stack layer 18 logs the UTRA frame number at this point.

The counter 14 is then started by the next UTRA frame interrupt signal which is generated by the low layers of the UMTS protocol stack at the start of the next UTRA frame.

The counter 14 continues until stopped by the next GSM frame pulse. This interrupt coincides with the passing of the current GSM frame number to the high layer 22 of the UMTS protocol stack as a result of the command issued as noted above.

The high layer 22 of the protocol stack checks the control register 16 of the counter 14 to ensure measurement is complete. If measurement is not complete, then it waits for a period of one GSM frame, increments the value for GSM frame received as noted above, and tries again, repeating the wait and increment if required. It should be noted that it is possible that a "complete" indication may not occur until the fourth GSM interrupt. This will be due to the relative lengths of the GSM and UMTS frames.

Software within the arrangement is arranged to read the counter and calculate the value of $T_{offset}$ from the following:

$$T_{offset} = \left[\text{current\_UTRA\_fn} \times 10 - \text{current\_GSM\_fn} \times \frac{60}{13} + \frac{\text{counter\_value}}{\text{counter\_freq}}\right] \text{MOD}\left(\frac{3060}{13}\right)$$

Here the counter_value is the value read from the counter 14 and counter_freq is the frequency of the counter clock.

Advantageously, the measurement can be made at any time when the frame numbers of both the UTRA cell and the GSM cell are known. It is importance not to stop the system's GSM air interface timer while the counter is running. However, the UTRA timer can be put into a low power mode after the frame interrupt, if so desired.

The $T_{offset}$ figure produced above is not the figure required by the network—it is the offset between the UMTS air interface timebase and the GSM reference timebase. The figure required by the network however is calculated by applying the offset between the free running timebase and the relevant GSM neighbour cell to the measured figure.

The only additional hardware required, over standard GSM and UMTS handset architectures, to implement the method described above is the $T_{offset}$ counter, illustrated in FIG. 2. The few software changes required can be introduced entirely at the top of the protocol stack.

What is claimed is:

1. A cellular radio communications device arranged for use with a first and second communication systems having different timebases, the device comprising:
    means for determining an offset between the timebase at a serving cell of the first system and the timebase of a neighboring cell of the second system, the means for determining including timing means controlled by frame-boundary signals of the first and second communication systems, the timing means being adapted to count up to a maximum of one GSM frame, a protocol stack of the first system having its timebase synchronized to the serving cell, and the second system having a free-running timebase, the free-running timebase being used to determine an offset between the free-running timebase of the second system and a timebase of the neighboring cell of the second system.

2. The device as claimed in claim 1, wherein the timing means is controlled by frame-zero signals from the circuitry of each respective communication system.

3. The device as claimed in claim 2, wherein the timing means is initiated by a frame-zero signal from the circuitry of the first system, and interrupted by a frame-zero signal from circuitry of the second system.

4. The device as claimed in claim 1, wherein the timing means is controlled by frame interrupt signals.

5. The device as claimed in claim 4, wherein the timing means is initiated by a frame interrupt signal from the first system, and interrupted by a frame interrupt signal from the second system.

6. A method of operating a cellular radio communication device arranged for use with a first and second communication system having different timebases, the method comprising the steps of:
    determining the offset between the timebase of a serving cell for the first system and the timebase of a neighboring cell of the second system, a protocol stack of the first system having its timebase synchronized to the serving cell, and the second system having a free-running timebase, the free-running timebase being used to determine an offset between free-running timebase of the second system and a timebase of the neighboring cell of the second system, and
    controlling a timing means for determining the offset by way of frame boundary signals of the first and second communication systems, the timing means being adapted to count up to a maximum of one GSM frame.

7. The method as claimed in claim 6, further comprising the step of controlling the timing means by frame-zero signals from the circuitry of each respective communication system.

8. The method as claimed in claim 6, further comprising the step of controlling the timing means by frame interrupt signals.

* * * * *